(No Model.)

W. HINCHLIFFE.
LOOM TEMPLE.

No. 546,778. Patented Sept. 24, 1895.

Witnesses,
Louis N. Gowell
Thomas J. Drummond

Inventor
William Hinchliffe.
by Crosby & Gregory
Attys.

UNITED STATES PATENT OFFICE.

WILLIAM HINCHLIFFE, OF HUNTSVILLE, ALABAMA, ASSIGNOR TO THE DUTCHER TEMPLE COMPANY, OF HOPEDALE, MASSACHUSETTS.

LOOM-TEMPLE.

SPECIFICATION forming part of Letters Patent No. 546,778, dated September 24, 1895.

Application filed August 24, 1893. Serial No. 483,893. (No model.)

*To all whom it may concern:*

Be it known that I, WILLIAM HINCHLIFFE, of Huntsville, county of Madison, State of Alabama, have invented an Improvement in Loom-Temples, of which the following description, in connection with the accompanying drawings, is a specification, like letters on the drawings representing like parts.

Loom-temples containing rollers set with needle-pointed teeth ordinarily rotate in the space between a cast-metal pod and cap concaved to surround the roller and aid in keeping the cloth in contact with the pins of the roll. In practice it happens occasionally that the screws or devices employed to keep the cap in proper position with relation to the pod, or the supports for the roll, get out of position, and in such event the fine needle-pointed teeth strike the interior of the cap or pod and are blunted, so that they fail to work properly and the roll has to be thrown away and another substituted for it. To obviate this trouble I have devised a temple in which the interior of the cap and of the pod, one or both, are provided with a lining less hard than the temple-roll teeth, so that in no event can the said teeth be blunted or destroyed by contact with the cap or pod. I prefer to use a lining of leather, wood, or cork; but this invention is not limited to the use of the said materials or to the particular shape of the same.

Figure 1:
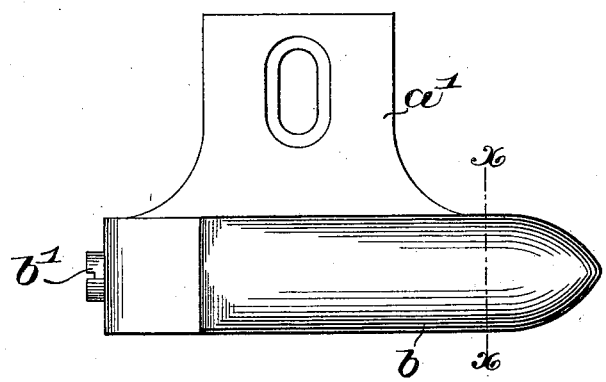
Figure 2:
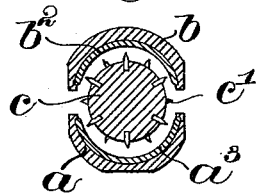

Figure 1 shows a temple-head, and Fig. 2 a section in the line $x$, Fig. 1.

The pod $a$, having the shank $a'$, the cap $b$, adjustably connected thereto by a suitable screw, as $b'$, and the roll $c$, having needle-pointed teeth $c'$, are and may be, except as to the interior of the cap and pod, all as usual. I take a cap or a pod, one or both, and line the same. The cap $b$ has a lining $b^2$ and the pod has a lining $a^3$. These linings will be of a material softer than the temple-roll teeth, so that the teeth will not by contact with the cap or pod have their points bent or broken. These linings may be applied in any suitable manner. Preferably they will be put into a groove or recess, as best shown in Fig. 2, and be caused to adhere to the iron by any suitable cement.

Having described my invention, what I claim as new, and desire to secure by Letters Patent, is—

1. A loom temple comprising a pod and a cap, and provided with a lining softer than the teeth of the temple roll, substantially as described.

2. A temple pod provided with a lining softer than the teeth of the temple roll, substantially as described.

In testimony whereof I have signed my name to this specification in the presence of two subscribing witnesses.

WILLIAM HINCHLIFFE.

Witnesses:
J. W. MATTHEWS,
GORDON FARISS.